April 30, 1957    C. L. GRAYBILL    2,790,471
POWER DRIVEN SCREW DRIVER
Filed July 19, 1955

CLINTON L. GRAYBILL
INVENTOR.

United States Patent Office 2,790,471
Patented Apr. 30, 1957

2,790,471

POWER DRIVEN SCREW DRIVER

Clinton L. Graybill, Superior, Mont.

Application July 19, 1955, Serial No. 523,040

5 Claims. (Cl. 144—32)

This invention relates to improvements in power hand tools and more particularly is directed to a novel power screw driver or the like tool and a drive coupling means between a tool chuck and a portable motor.

A primary object of this invention is to provide compact, non-chattering and instantaneously engaged and disengaged drive coupling or clutch means for connecting the drive shaft of a portable hand motor and a tool chuck which is adapted to hold a screw driver bit or other similar rotary action tool, such as a drill bit, wrench and the like.

Another important object of this invention is to provide a clutch for coupling the drive shaft and the tool chuck, the clutch being engaged, for example, as the screw driver bit starts to screw in a screw and being automatically disengaged when the screw is driven into place.

A further important object of this invention is to provide a clutch release means which surrounds the driver bit and is engageable with a work piece when the screw is driven into final position in the work piece and which reacts to such abutment with the work piece to automatically disengage the clutch.

A still further important object of this invention is to provide means for braking the rotation of the tool chuck at the instant the clutch is disengaged, so that, upon disengagement of the clutch, the tool chuck instantly stops rotating.

A still further important object of this invention is to provide a novel and friction free mounting means for a clutch element on the motor drive shaft and to provide secure and easy interfitting clutching engagement between such clutch element and a companion clutch element provided on the tool chuck.

A still further important object of this invention is to provide an adjustable clutch release means, which can be adjusted to desired position relative to the tool.

A still further important object of this invention is to provide a compact, inexpensive, durable and noiseless coupling means for connecting the drive shaft of a portable hand motor to a tool chuck, particularly one adapted to hold a screw driver bit.

The foregoing and ancillary objects are attained by this invention, the preferred embodiments of which are set forth in the following description and illustrated in the accompanying drawing.

In the accompanying drawing:

Figure 1 is a longitudinal sectional side view of the invention shown in an inoperative position;

Figures 2, 3 and 4 are transverse cross-sectional views taken, respectively, along the lines 2—2, 3—3 and 4—4 of Figure 1;

Figure 1:
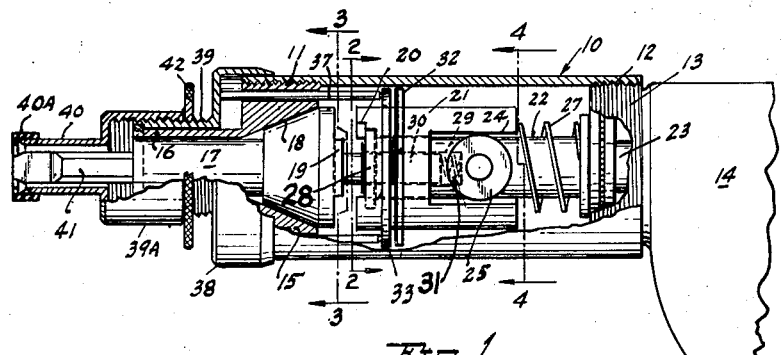
Figure 2:
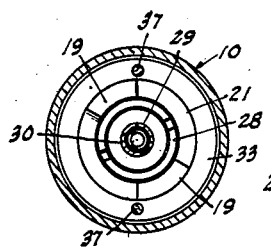
Figure 3:
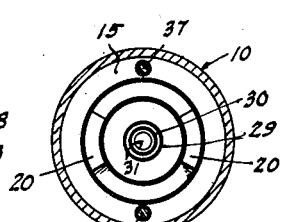
Figure 4:
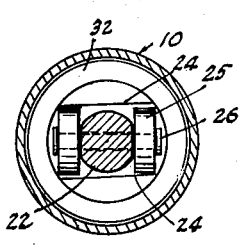

Referring particularly to the drawing in which like symbols designate corresponding parts throughout the several views, reference numeral 10 indicates a main hollow cylindrical housing having internally threaded ends 11 and 12. The housing by means of its threaded end 12 is secured to a threaded extension 13 of a portable power tool 14. Into the opposite end of the housing is threadedly secured a head 15 having a forwardly extending tubular extension 16, which serves as a bearing for a tool chuck 17 slidably and rotatably mounted therein and having an enlarged frusto-conical inner end portion adapted to seat, under certain conditions, within a tapering seat 18 formed within the head 15. The tool chuck also serves as a clutch element by means of teeth 19 formed on its inner end cooperating with teeth 20 formed on a companion clutch element 21 slidably mounted upon but rotatable with a driving shaft 22 coupled in any approved manner to the shaft 23 of the power tool 14. The inner end of the clutch element 21 is bifurcated as at 24 to embrace a pair of rollers 25, attached as at 26 to the shaft 22, to reduce operational friction to a minimum. A compression spring 27 surrounds the shaft 22 to normally maintain the clutch element 21 in its forward position shown in Figure 1 and bearing against a nut 28 secured to the end of the shaft 22. This same end of the shaft 22 is internally bored as at 29 to slidably receive a reduced and internally bored extension 30 of the enlarged end of the tool chuck 17. A compression spring 31 is disposed within the extension 30 and the bore 29 for restoring the tool chuck to the position shown in Figure 1 when it is not operating.

Permanently secured to or formed integral with the clutch element 21 is a flange 32. Freely mounted on the clutch element, in advance of the flange, is a ring 33. Interposed between the ring and flange and also surrounding the clutch element is a compression spring, which as shown comprises a plurality of spring fingers 35 punched from a ring 36 and bearing at all times against the ring 33 which normally bears against the inner end of at least two clutch-releasing rods 37. The opposite ends of the rods are permanently secured to a cap 38 surrounding the exterior of the end of the housing 10 and extended and reduced in diameter to surround the tool chuck as at 39. This reduced portion of the cap is externally threaded for attachment to an internally threaded auxiliary cap 39A reduced in diameter and extended as at 40 to surround a screw driver bit 41 or any other suitable tool attached to and extending outwardly from the chuck 17. The outer end of the extension is provided with a resilient cap 40A to protect the surface of work being dealt with. The auxiliary cap is backed by a lock nut 42 for securing the auxiliary cap in any adjusted position with respect to the tool chuck and a tool carried thereby.

Figure 7:
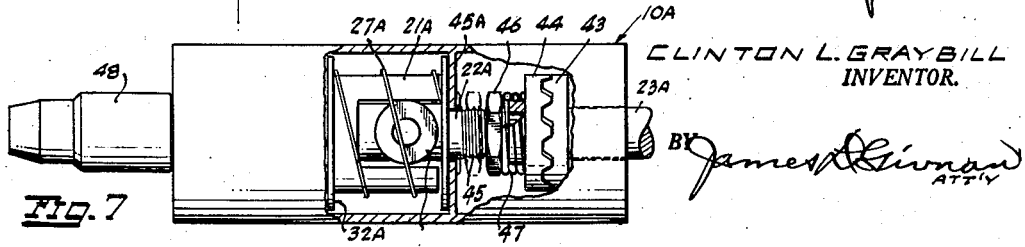
Figure 7 is a further view similar to Figure 1 and illustrating the adaptation of any suitable type of "slip-clutch" to the invention.

In the modification shown in Figure 7 I interpose a slip-clutch between the drive shaft 23A of a power tool and the driven shaft 22A. One clutch element 43 is secured to or formed integral with the shaft 23A and the other, indicated at 44, is splined to and slidable on the end of the shaft 22A which is also threaded as at 45. The shaft 22A is journaled in a partition wall 45A within the housing 10A. The chamber forward of the partition wall houses the other elements of the invention indicated by their respective reference numerals to which have been added the letter "A." In this modification the clutch-releasing mechanism and its related parts have been eliminated to permit use of a conventional tool chuck 48. An adjusting nut 46 is carried by the threaded end of the shaft 22A for regulating the compression of a coil spring 47 surrounding the hub and bearing at one of its ends against the clutch element 44 and at its opposite end against the nut 46.

Figure 5:
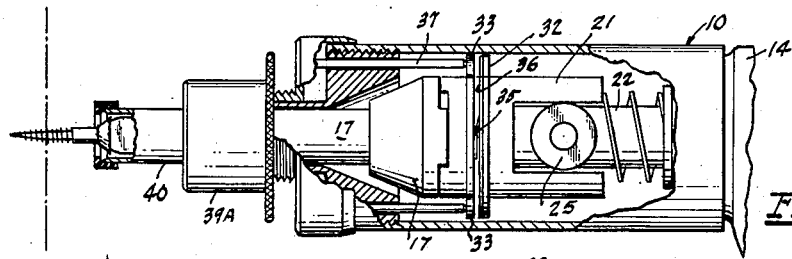
Figure 5 is a view similar to Figure 1 showing the invention in an operative driving position while driving a screw into a work piece.

The bit 41 is shown in Fig. 5 as engaged in the kerf of the head of a screw, which is to be screwed into the work piece. In such operative position, the clutch element 21 is engaged with the clutch element on the tool chuck 17. The teeth 19 on the inner end of the tool chuck are interengaged with the teeth 20 on the clutch element 21, such engagement being effected by the inward sliding movement of the tool chuck caused by the axial abutment of the bit with the head of the screw. The spring 27 resists the rearward thrust on the clutch element 21 and maintains it engaged with the teeth on the tool chuck.

Figure 6:
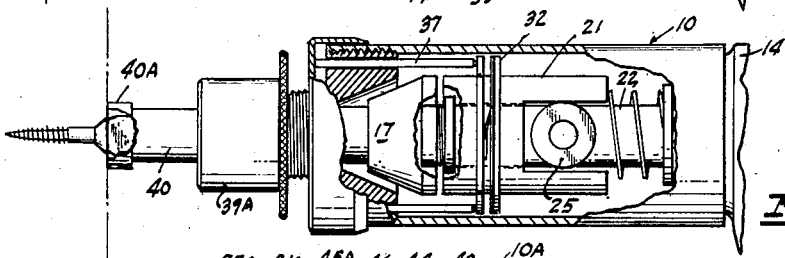
Figure 6 is also a view similar to Figure 1 showing the screw completely driven home and the resultant instantaneous disengagement of the clutching elements.

When the screw is driven home in the work piece, as shown in Fig. 6, the cap 40A on the extension 40 abuts against the work piece at the instant the head of the screw is seated in the work piece. The extension 40 is moved rearwardly and moves the cap 38 rearwardly to force the rods 37 rearwardly. The rods bear against the ring 33 and move the ring and flange 32 rearwardly, the flange carrying the clutch element 21 away from the teeth on the tool chuck. The clutch element slides with a minimum of friction due to the roller guide arrangement and the rearward driving force of the rods is effectively absorbed by the spring fingers 35 or similar compression spring unit. The drive between the motor shaft and the tool chuck is, therefore, instantly uncoupled when the screw is driven home in the work piece.

The tool chuck 17, when the tool is then moved away from the work piece, is forced outwardly by the spring 31 to force the frusto-conical end portion into a friction held position in the tapered seat 18.

The action of the clutch is smooth and no shock is experienced nor is there any chattering or noise.

In the form shown in Fig. 7, the clutch between the tool chuck and shaft 22A functions in the same efficient manner, as the clutch means in Figs. 1–6 with the slip clutch being used instead of the clutch-releasing mechanism of Figs. 1–6.

While the preferred forms of my invention have been shown and described herein, other forms may be commercially realized, as come within the scope of the invention defined by the appended claims.

What is claimed is:

1. A power screw driver for use with a power hand tool which includes a drive shaft, said power screw driver comprising a cylindrical casing having opposing open ends, means fixing one end to the power hand tool with the drive shaft of the tool extending into the housing, a clutch element, means slidably and non-rotatably mounting the clutch element on the drive shaft, said last mentioned means including a pin transversely fixed in the drive shaft and having opposing ends radially projecting in opposite directions from the drive shaft, roller elements rotatably carried by the ends, said clutch element having a bifurcated sleeve end with the bifurcations riding on the rollers, spring means backing said clutch element, a tool chuck slidably disposed in the housing and extending through the other end thereof, said tool chuck being adapted, at its outer end, to hold a screw driver bit and having an inner clutch end engageable with the clutch element, a clutch release member concentrically disposed to the chuck and bit and slidable on the housing, means adjusting the length of said release member, and means carried by the release member and the clutch element for moving the clutch element away from the clutch end on the tool chuck when the release member abuts a work piece as a screw is driven home in the work piece.

2. A power screw driver as claimed in claim 1, wherein said spring means backing the clutch element includes a compression spring coiled on the drive shaft and bearing against the bifurcated sleeve end of the clutch element.

3. A power screw driver as claimed in claim 1, wherein said clutch release member includes a cap member slidable on the housing and having a tubular sectional extension and said means adjusting the length of said release member including a threaded connection between such sections.

4. A power screw driver as claimed in claim 1, wherein said last means includes rods extending inwardly in the housing from the release member and a lateral projection on the clutch element against the face of which the rods are engaged.

5. A power screw driver as claimed in claim 4, wherein said projection is a ring slidable on the clutch element, a flange fixedly projecting laterally from the clutch element behind the ring and a compression spring means interposed between the ring and the flange.

References Cited in the file of this patent

UNITED STATES PATENTS

| 702,934 | Errington | June 24, 1902 |
| 1,196,839 | Bodene | Sept. 5, 1916 |
| 1,539,782 | Stonsell | May 26, 1925 |
| 2,658,538 | Kitterman | Nov. 10, 1953 |
| 2,705,030 | Koffler et al. | Mar. 29, 1955 |

FOREIGN PATENTS

| 625,352 | France | Apr. 23, 1927 |
| 686,370 | France | Apr. 14, 1930 |
| 264,386 | Switzerland | Jan. 3, 1950 |
| 891,680 | Germany | Oct. 1, 1953 |